Dec. 29, 1959   W. E. POULSEN   2,918,901
AUTOMATIC WILD BIRD FEEDER
Filed Feb. 6, 1958   3 Sheets-Sheet 1

INVENTOR.
WILHELM E. POULSEN
BY
ATTORNEY

Dec. 29, 1959  W. E. POULSEN  2,918,901
AUTOMATIC WILD BIRD FEEDER
Filed Feb. 6, 1958  3 Sheets-Sheet 2

INVENTOR.
WILHELM E. POULSEN
BY
ATTORNEY

Dec. 29, 1959  W. E. POULSEN  2,918,901
AUTOMATIC WILD BIRD FEEDER
Filed Feb. 6, 1958  3 Sheets-Sheet 3

INVENTOR.
WILHELM E. POULSEN
BY
ATTORNEY

United States Patent Office 2,918,901
Patented Dec. 29, 1959

2,918,901

AUTOMATIC WILD BIRD FEEDER

Wilhelm E. Poulsen, New York, N.Y.

Application February 6, 1958, Serial No. 713,688

3 Claims. (Cl. 119—51)

This invention relates to bird feeders, and more particularly has reference to a bird feeder that is equipped with means for preventing birds above a predetermined weight from partaking of the feed.

The invention is intended for feeding of wild birds. Considerable difficulty has been experienced in the feeding of wild birds, resulting from the fact that large birds attempt to feed from the device. Said birds are often extremely undesirable members of the bird family, and not only consume excessive amounts of the feed, but also, and more importantly, deny smaller birds the right to feed from the device.

Accordingly, in accordance with the invention, the device is designed for closing the door to the space within which the feed is disposed, responsive to imposition of an excessive amount of weight, such as the weight of a large bird, upon the perch that is provided at the entrance to the device. Thus, if it is desired to limit use of the device to birds weighing two ounces or less, a bird weighing more than two ounces, when imposing his weight upon the perch preliminary to entering the feeding space, will cause the door to be closed.

Another object is to not only cause automatic closing of the door responsive to imposition of an excessive amount of weight upon the entrance perch, but also, cause said entrance perch to move downwardly when said excessive weight is imposed thereon, so as to tend to cause the large bird to be dislodged and fly away.

Another object is to provide adjustment means that will permit the accurate selection of the weight that can be imposed upon the entrance perch without causing closure of the door of the device.

Another object is to provide a bird feeder as stated which will be swivelly mounted, and will be of the vane type, so that it will turn with the wind.

Another object is to so mount the vane means of the device that at all times the entrance will be shielded, that is, will be at the lee side of the device rather than at the windward side.

Another object is to provide a slidably adjustable food support means within the shelter, so as to permit selective location of said means within the shelter.

Another object is to provide a particular, coactive relationship between the slidable adjustment of the food support means and the swivel means, such that the slidable food support means can be located to one or the other side of the swivel axis and vanes, to control the freedom of swiveling movement of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
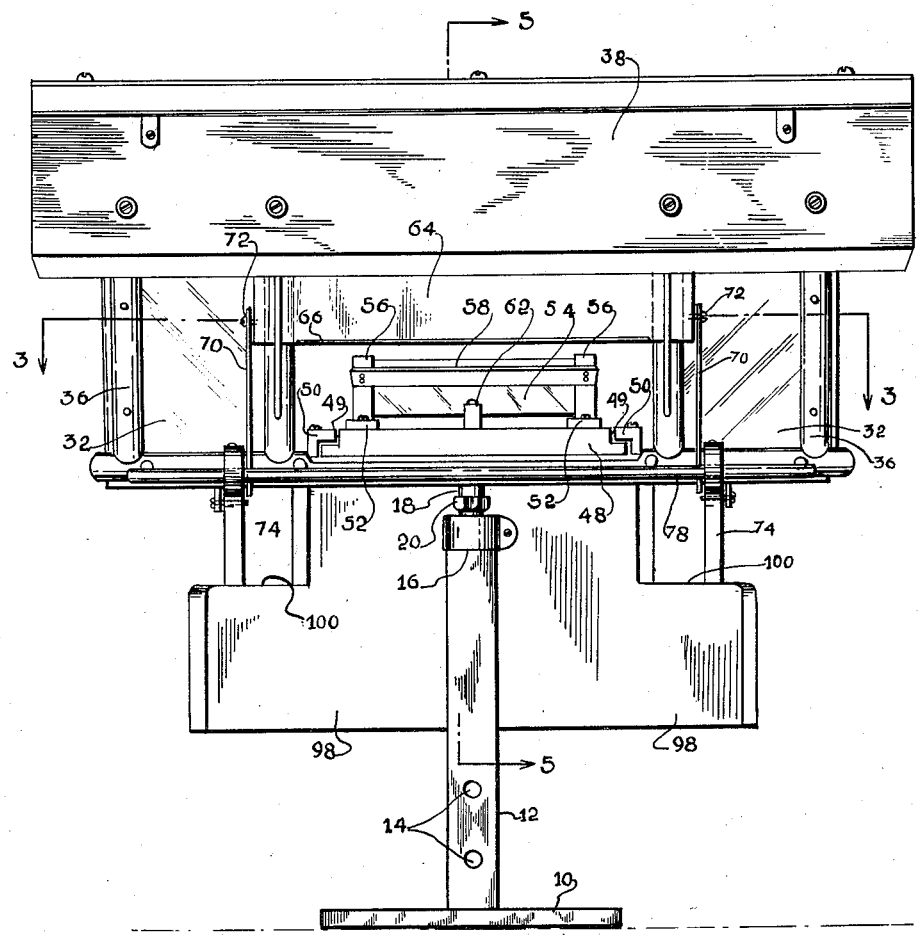
Fig. 1 is a front elevational view of a bird feeder according to the present invention.

Referring to the drawings in detail, the bird feeder constituting the present invention includes a flat base 10 disposed in a horizontal plane and adapted to be fixedly secured to any suitable, adjacent support. Rigid with and projecting upwardly from the base is a standard 12 cooperating with the base in defining a pedestal, and said standard may be formed with vertically spaced openings 14.

A swivel is provided on the upper end of the standard, said swivel including a clamp 16 in the form of a split ring clamp, the opopsite sides of which are adapted to be drawn toward each other by means of a bolt 17, to cause the clamp to be tightened into engagement with the upper end of the standard. A stub 18 extends in coaxial alignment with the standard, and swivels upon a spindle 19. A nut 20 is threaded upon the stub, and is adapted to control the freedom of rotational movement of the stub upon the spindle.

Stub 18 is fixedly secured to the underside of a rectangular floor plate 22 of a shelter generally designated 23. Rigid with and projecting upwardly from the several corners of the floor plate 22 are corner posts or frame members 24 (Fig. 3) and mounted upon and extending between the posts is a back wall 26 formed of glass, and side walls 28 also formed of glass. Also at the front of the shelter, inwardly from the respective corners, there are jambs 30, and connected between the jams and the respective, adjacent corner posts 24 are small glass front wall panels 32. Defined between the jambs is a large opening, through which the birds enter to partake of the food provided within the shelter.

Suitable molding strips 34 are applied to the back, ends, and front of the shelter, being secured to the periphery of the floor plate. Projecting upwardly from the moldings 34 are molding strips 36 that are vertically disposed, cooperating with the several corner posts in fixedly mounting the glass panels 26, 28, 32 in their assigned positions.

A roof structure comprises downwardly divergent roof panels 38, fixedly mounted upon the posts 24, and secured together by a ridge peak 42.

Extending across the upper portion of the open doorway defined between the jambs 30 is a glass panel 44 connected between short, vertically depending members 46 rigid with the frame of the shelter.

Within the shelter there is provided a food container support plate 48. This is a slide, adapted to slide between the full and dotted line positions thereof shown in Fig. 3, that is, toward the front or rear of the shelter. At its opposite sides, the plate 48 has angular side recesses 49, and to provide a guideway for the plate there are complementary rails 50 fixedly mounted upon the floor plate 22 of the shelter 23.

Figure 3:
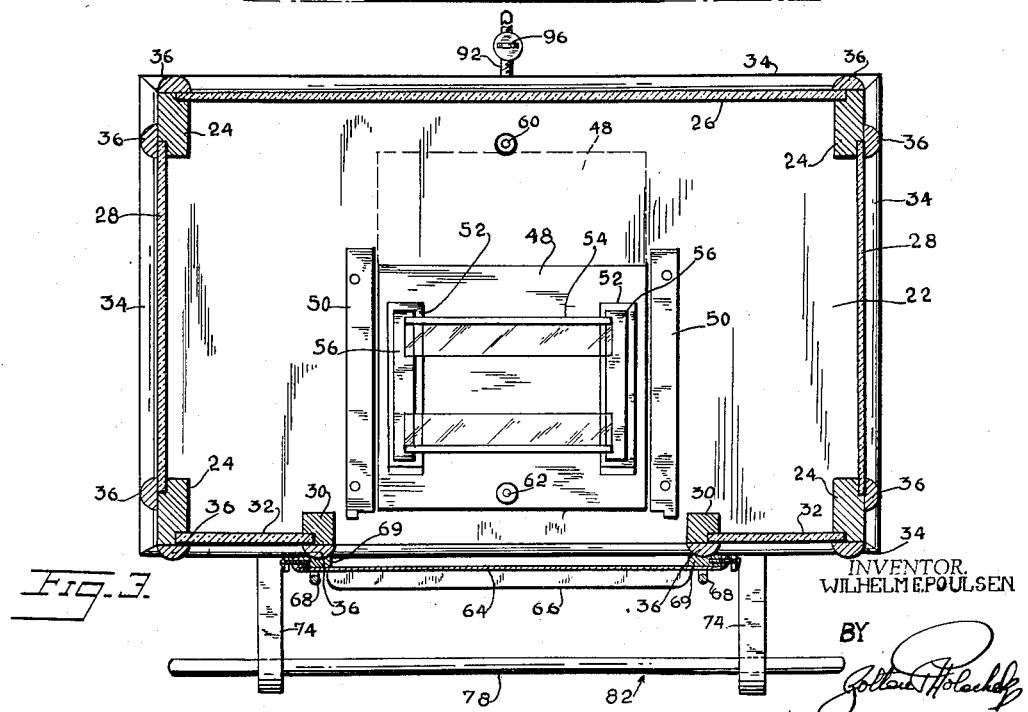
Fig. 3 is a horizontal sectional view through the bird feeder, substantially on line 3—3 of Fig. 1.

A food container is mounted fixedly upon the slide plate 48, and as shown in Fig. 3 includes parallel support strips 52. Upwardly divergent side walls 54 of a food container that also includes a pair of end walls 56 are disposed upon the strips 52. End walls 56 are rigid with and project upwardly from the respective strips, and side walls 54 are connected fixedly between the end walls 56. Reinforcing strips or perches 58 are provided, also connected between the end walls, and so disposed (see Fig. 5) as to facilitate access to the food disposed within the container.

A stop is provided, limiting the rearward movement of the slide plate. This is designated at 60, and comprises an upwardly projecting, rubber bumper mounted upon the plate 22 and limiting the plate 48 against rearward movement beyond the dotted line position shown in Fig. 3.

A handle 62 is formed similarly to the stop 60, and projects upwardly from the forward edge portion of the plate 48.

Extending across the open doorway is a closure plate 64, formed of sheet metal material or the like, and having a forwardly projecting lip 66 at its bottom. Closure plate 64 is adapted, when swung downwardly from its position shown in Fig. 5, to close the doorway against the admission of undesirable, large birds. The closure plate, however, is normally disposed in its upwardly adjusted position shown in Fig. 5, to permit access to the shelter so far as small birds, weighing less than a predetermined amount, are concerned.

The opposite side edge portions of the closure plate 64 are loosely, slidably engaged in guideways defined by vertically disposed lengths of wire 68, the ends of which are projected rearwardly and are engaged in the adjacent molding strips. In this connection, the closure plate, at its opposite ends, is connected to strips 69, that slide upon the adjacent molding strips 36.

Figure 4:
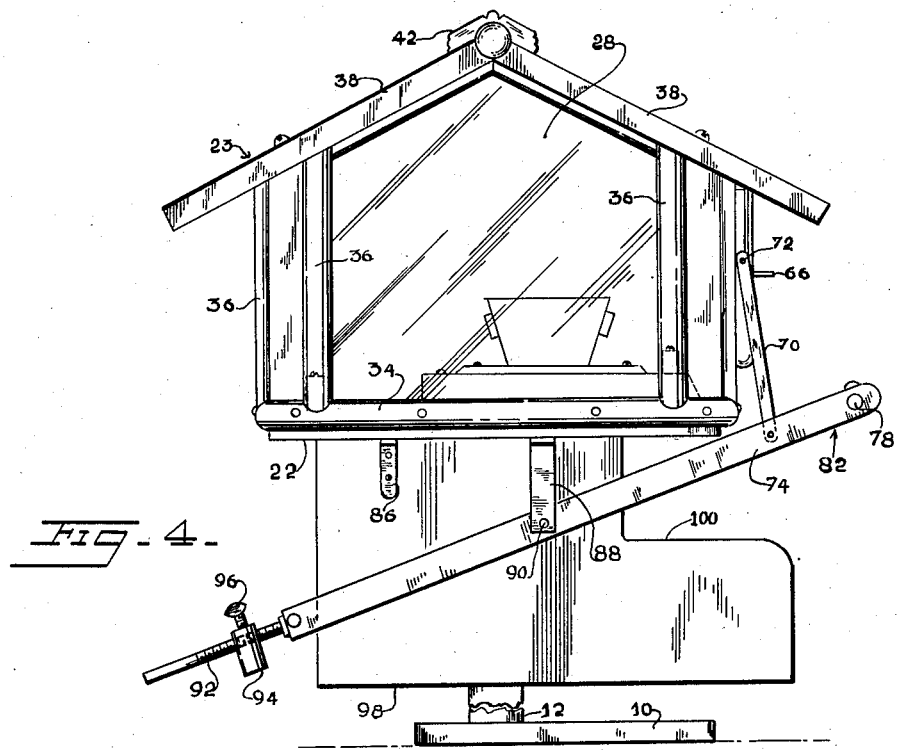
Fig. 4 is an end elevational view of the bird feeder as seen from the left of Fig. 1, a portion of the pedestal being broken away.
Figure 5:
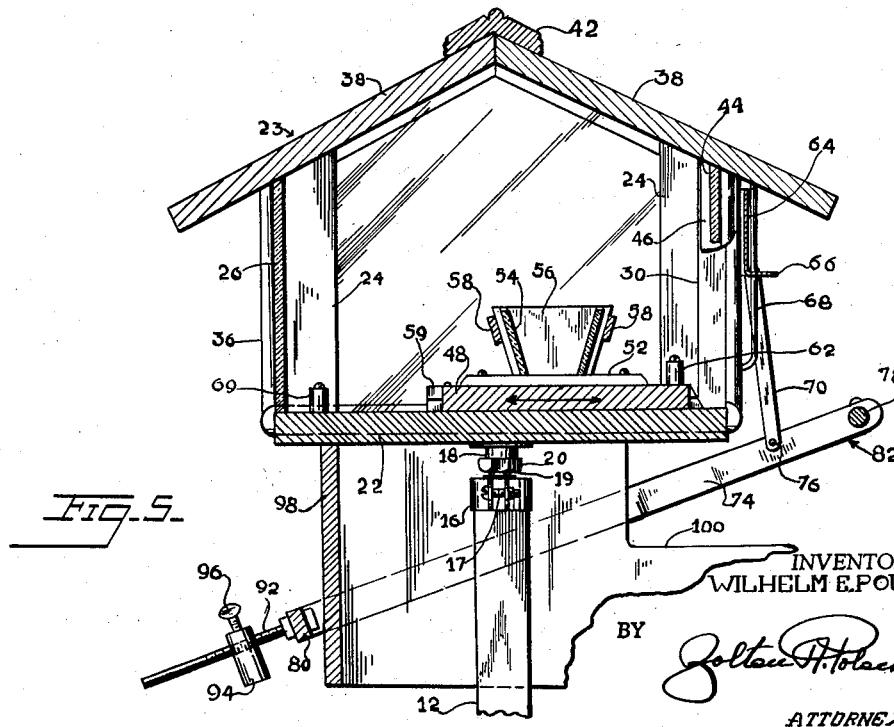
Fig. 5 is a vertical sectional view through the feeder substantially on line 5—5 of Fig. 1.

Loosely, pivotally connected at their upper ends, by means of pins 72, to the strips 69, are links 70. These extend downwardly, forwardly from the doorway, as shown in Figs. 4 and 5, and at their lower ends are pivotally connected to the forward edge portions of arms 74, by means of pivot pins 76.

Arms 74 are disposed in parallel relation, and are extended in a fore-and-aft direction, below the shelter 23. The arms are conjointly rockable about a horizontal pivot axis, and to connect the same for conjoint rocking movement there is provided a perch 78 fixedly connected between the forward extremities of the arms 74 (see Fig. 3).

Figure 2:
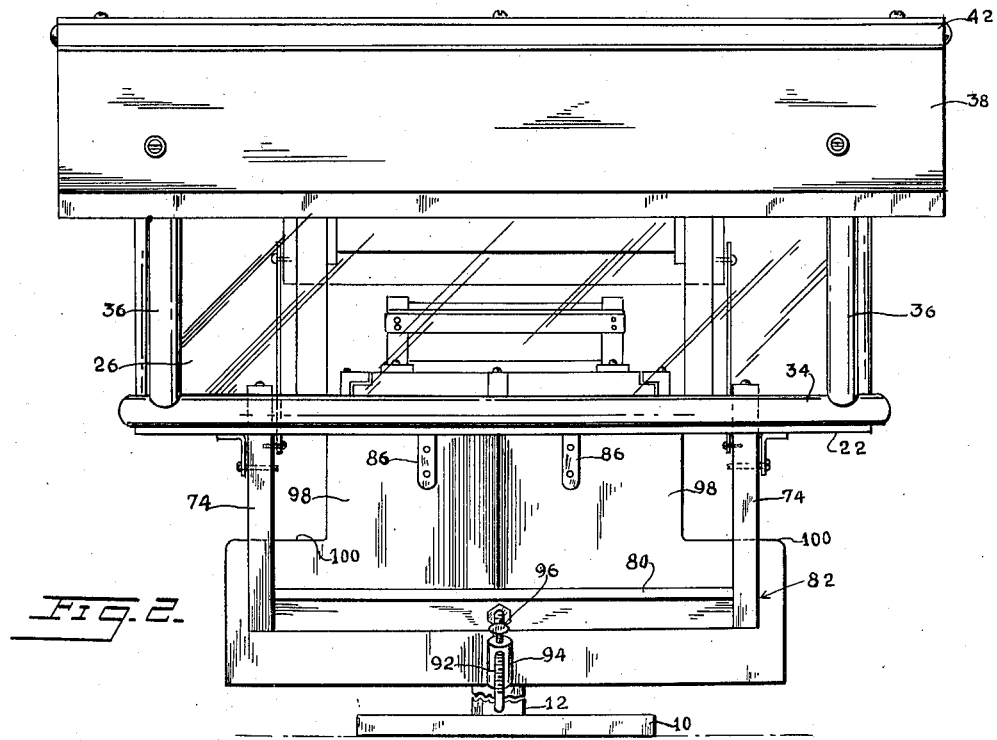
Fig. 2 is a rear elevational view thereof, a portion of the pedestal being broken away.

Fixedly connecting the rear end portions of the arms is a connector bar 80, shown to best advantage in Fig. 2.

Thus, the arms 74, perch 78, and connector bar 80 cooperate in defining a rectangular, open-center frame generally designated at 82, said frame pivoting upon depending angle brackets 88 fixedly secured to the underside of the floor plate 22 and having pivot pins 90 extending through the arms 74.

Projecting rearwardly from and secured to the midlength portion of the connector bar 80 is a threaded stud 92, on which is provided a weight 94 adjustable longitudinally of the stud and secured in selected positions of adjustment by means of a setscrew 96.

Means is provided in the device for causing the same to turn with the wind, weathervane fashion. To this end, there are provided vanes 98, converging in a rearward direction, said vanes 98 being in the form of flat boards fixedly secured to and extending downwardly from the plate 22. To fixedly connect the vanes to the plate 22 there are provided angle brackets 86 attached to the vanes and to the floor plate.

The divergent, forward ends of the vanes 98 are provided with deep, angular recesses 100.

The construction is such that by selective positioning of the weight 94, the frame 82 will be so balanced upon its pivot axis as to normally remain in the Fig. 4 position, with the closure plate 64 disposed in an upper position so as to permit access to the inside of the shelter. However, when a bird alights on perch 78, as it would before entering the shelter, said perch will remain in its upper position shown in Figs. 4 and 5 only if the bird is less than a predetermined weight. For example, the weight 94 can be so positioned that if a bird is heavier than two ounces, the frame 82 will swing clockwise about its pivot axis defined by pins 90, immediately upon alighting of a bird on the perch 78.

As a result, the bird is immediately dislodged and caused to fly off, without obtaining access to the interior of the shelter, and simultaneously with the tendency of the bird to be dislodged, the closure plate 64 is immediately adjusted downwardly to a doorway-closing position, by reason of the link means 70 connecting the frame 82 to the closure plate 64.

Of course, various adjustments can be provided, designed to permit one to select the particular weight limit for birds that are to be permitted to feed from the shelter.

Another desirable feature of the invention resides in the fact that at all times, the doorway is sheltered from the wind. The doorway opens to the front of the house, and, of course, as previously described, the vanes 98 diverge in a forward direction. Therefore, when the wind strikes the vanes, the house will swivel on its pedestal so that the doorway is always at the lee side, so far as the wind is concerned.

In this way, the birds are at all times sheltered, and efficient functioning of the counterweighted frame is at all times assured.

Another feature of substantial importance resides in the fact that the adjustable positioning of the plate 48 has an effect on the swiveling of the bird house. If one desires to slightly inhibit the free swiveling movement (that is, prevent the bird house from being so sensitive to wind changes that it will turn even in a slight breeze and disturb birds that are feeding at the time within the shelter) he can do so by adjustment of plate 48.

By locating the slide plate 48 on dead center so far as the axis of swiveling movement is concerned, maximum freedom of rotational movement of the bird house is provided. By offsetting the plate 48 in a direction forwardly from the swivel axis, that is, to the full line position shown in Fig. 5, the freedom of swiveling movement is reduced somewhat, since the greatest part of the weight is concentrated above the divergent portions of the vanes.

If, on the other hand, the plate 48 is moved toward the rear of the shelter, to the dotted line position shown in Fig. 3, it is disposed where it will have a minimum effect on the free swiveling movement of the shelter.

Still further, the adjustment of the plate 48 permits selective positioning of the food container within the shelter 23. By centering the same within the shelter, birds are permitted maximum freedom of entry, even in substantial numbers. By locating the plate 48 in the doorway, or close to the doorway as in full lines in Fig. 3, there is more restriction on the freedom of entry of birds into the shelter, so as to have the effect of reducing the number of birds that may seek and be permitted admission at a particular time.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new and desire to secure by United States Letters Patent is:

1. A selective bird feeder comprising a base, a pedestal extending upwardly from the base, a hollow shelter supported on top of the pedestal, said shelter having an entrance opening for a bird, a bird food container in the shelter behind the entrance, a closure plate for the opening slidably mounted on the shelter, said plate having a vertical path of movement, a weight discriminating bird feeder device having a rotating support on the shelter, said device including a weight responsive means supported on the shelter, said means having a perch on one end and an adjustable counterweight on the other end including a pair of arms pivoted intermediate the ends and a linking means connecting the arms and closure plate, said closure plate being normally in open position, said weight responsive means adapted to be actuated by the weight of a bird landing on the perch for closing the closure plate to prevent access to the food container.

2. A selective bird feeder as defined in claim 1, wherein the shelter includes a floor plate and wherein the food container is mounted on a plate slidably mounted on the floor plate and movable toward and away from the entrance opening, said food container including upwardly divergent side walls and end walls and being open at the top, and perches for birds along the side walls and extending between the end walls.

3. A selective bird feeder as defined in claim 1, wherein the shelter includes a floor plate, wherein the shelter is rotatably supported on the pedestal and wherein means is provided for causing the shelter to turn with the wind, said latter means including spaced flat boards fixed to the floor plate and depending downwardly therefrom and converging in a rearward direction, said boards having angular recesses in the forward ends thereof.

References Cited in the file of this patent

UNITED STATES PATENTS

| | | |
|---|---|---|
| 1,062,610 | Schisler | May 27, 1913 |
| 1,922,435 | Harris | Aug. 15, 1933 |
| 2,108,102 | Busch | Feb. 15, 1938 |
| 2,230,058 | Hornung | Jan. 28, 1941 |
| 2,524,502 | Wilkinson | Oct. 3, 1950 |
| 2,595,324 | Baker | May 6, 1952 |

OTHER REFERENCES

Popular Mechanics Magazine, January 1943, page 71.